US011669709B2

(12) United States Patent
Forster

(10) Patent No.: US 11,669,709 B2
(45) Date of Patent: Jun. 6, 2023

(54) CONTROLLED ENERGY ADSORPTION BY SELF-LIMITING HEATING FOR CURING PROCESSES

(71) Applicant: Avery Dennison Retail Information Services, LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 46 days.

(21) Appl. No.: 17/189,649

(22) Filed: Mar. 2, 2021

(65) Prior Publication Data

US 2021/0271949 A1    Sep. 2, 2021

Related U.S. Application Data

(60) Provisional application No. 62/983,970, filed on Mar. 2, 2020.

(51) Int. Cl.
  *G08B 23/00* (2006.01)
  *G06K 19/077* (2006.01)
  *H01Q 1/22* (2006.01)
  *G06K 19/07* (2006.01)
  *H01Q 1/00* (2006.01)

(52) U.S. Cl.
  CPC ..... *G06K 19/0775* (2013.01); *G06K 19/0723* (2013.01); *G06K 19/07775* (2013.01); *H01Q 1/002* (2013.01); *H01Q 1/2225* (2013.01)

(58) Field of Classification Search
  CPC ........... G06K 19/0775; G06K 19/0723; G06K 19/07775; H01Q 1/002; H01Q 1/2225
  See application file for complete search history.

(56) References Cited

U.S. PATENT DOCUMENTS

| | | | | |
|---|---|---|---|---|
| 4,715,923 A | * | 12/1987 | Knoll | B29C 66/00441 425/389 |
| 4,983,804 A | * | 1/1991 | Chan | H05K 13/0465 219/616 |
| 5,287,112 A | * | 2/1994 | Schuermann | G06K 19/0723 342/51 |
| 7,030,453 B1 | * | 4/2006 | Agnese | G01J 5/08 374/E11.003 |
| 7,591,409 B2 | * | 9/2009 | Naito | H01L 21/67144 228/103 |
| 8,530,289 B2 | * | 9/2013 | Yamazaki | H01L 27/11517 438/161 |

(Continued)

*Primary Examiner* — Quang Pham

(57) ABSTRACT

Methods for manufacturing RFID devices are provided with self-limiting heating features. Inducing current flow through the antenna of an RFID device (e.g., by exposing the antenna to a changing magnetic field) will increase heat of the RFID device, thereby curing/sintering elements of the RFID device (which may include curing an adhesive used to couple the antenna to an RFID chip) without applying external heat, which typically heats regions of the RFID device that were not intended to be heated (e.g., the substrate to which the antenna is secured). Inducing current flow through the antenna of an RFID device will reduce the resistance of the antenna, which has a heat-limiting effect that prevents overheating of the RFID device. Inducing current flow may also change the resonant frequency of the antenna, which may provide another heat-limiting effect.

19 Claims, 4 Drawing Sheets

(56) References Cited

U.S. PATENT DOCUMENTS

| | | | | |
|---|---|---|---|---|
| 9,776,270 B2* | 10/2017 | Ayotte | | B23K 1/002 |
| 10,245,667 B2* | 4/2019 | Ayotte | | H05K 3/3494 |
| 2002/0088777 A1* | 7/2002 | Grewell | | B23K 26/702 |
| | | | | 219/121.63 |
| 2005/0282355 A1* | 12/2005 | Edwards | | H01L 24/81 |
| | | | | 438/455 |
| 2007/0007344 A1* | 1/2007 | Inoue | | G06K 19/0775 |
| | | | | 235/435 |
| 2008/0286948 A1* | 11/2008 | Miyazaki | | H01L 21/78 |
| | | | | 438/464 |
| 2009/0257473 A1* | 10/2009 | Tuttle | | H04B 1/713 |
| | | | | 375/135 |
| 2009/0265924 A1* | 10/2009 | Ebihara | | H05K 13/046 |
| | | | | 29/739 |
| 2011/0133896 A1* | 6/2011 | Rossman | | G06K 19/07786 |
| | | | | 340/10.1 |
| 2012/0155640 A1* | 6/2012 | Cotner | | H04L 9/001 |
| | | | | 380/252 |
| 2013/0106579 A1* | 5/2013 | Aubert | | G06K 19/077 |
| | | | | 235/492 |
| 2013/0139380 A1* | 6/2013 | Lee | | H05K 3/32 |
| | | | | 29/739 |
| 2014/0376935 A1* | 12/2014 | Egi | | G03G 15/2053 |
| | | | | 399/33 |
| 2015/0077101 A1* | 3/2015 | Oikawa | | G01R 33/0041 |
| | | | | 324/258 |
| 2016/0328582 A1* | 11/2016 | Steinbrunner | | G05D 1/0261 |
| 2017/0312841 A1* | 11/2017 | Ayotte | | B23K 1/002 |
| 2018/0165561 A1* | 6/2018 | Gabriel | | G06K 19/0707 |
| 2018/0210337 A1* | 7/2018 | Wakita | | G03F 7/0045 |
| 2019/0075623 A1* | 3/2019 | Hoffman | | H05B 6/108 |
| 2019/0081402 A1* | 3/2019 | Kato | | H01Q 9/42 |
| 2019/0306927 A1* | 10/2019 | Heczko | | H05B 6/062 |
| 2019/0334230 A1* | 10/2019 | Jesme | | H04B 5/0081 |
| 2020/0106538 A1* | 4/2020 | Zai | | H04B 17/3911 |
| 2021/0222032 A1* | 7/2021 | Saxberg | | C09J 7/255 |
| 2021/0367325 A1* | 11/2021 | Kato | | H01Q 9/24 |

* cited by examiner

CONTROLLED ENERGY ADSORPTION BY SELF-LIMITING HEATING FOR CURING PROCESSES

CROSS-REFERENCE TO RELATED APPLICATION

The present application claims the benefit of U.S. Provisional Patent Application No. 62/983,970 filed Mar. 2, 2020, which is incorporated herein by reference in its entirety.

FIELD

The present subject matter relates to radio frequency identification ("RFID") devices. More particularly, the present subject matter relates to the use of self-regulating mechanisms to limit heat applied to parts of an RFID device during manufacture.

BACKGROUND

Application of heat is usually required in the manufacture of RFID devices. Different parts of the device may require heat to achieve a final, desired state. For example, a printed ink antenna requires curing and/or sintering to reach a final desired resistance of the antenna. An adhesive used to secure an RFID chip with respect to the antenna may also be cured using heat.

Externally applied heat is typically used in these processes and can be applied, for example, by using a heated roller, hot air jets, infra-read lamps, and/or conduction from an oven. In these cases, the process is dependent on time to conduct sufficient energy to the antenna to reach a critical temperature. As a result, the substrate of the RFID device may also be heated. Moreover, heat is typically applied in an open-loop, or continuous, system. Because the speed of a web of material moving through the system cannot be changed, the system requires that excess energy is applied via longer contact times or larger ovens, often resulting in increased cost for energy and equipment.

Although the above-described systems are widespread, there are certain disadvantages. For example, it would be desirable to have a method of delivering energy to an RFID device that would heat it and progress it to a desired state automatically. It would also be desirable to have energy applied in a self-regulated manner.

SUMMARY

There are several aspects of the present subject matter which may be embodied separately or together in the devices, systems, and methods described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

Methods of manufacturing an RFID device are described herein. In some embodiments, the method includes attaching an antenna to a substrate, applying heat to the antenna to reduce the resistance of the antenna from an initial resistance to a final resistance, and coupling an RFID chip to the antenna, with the antenna being heated without externally applied heat.

In other embodiments, methods of manufacturing an RFID device includes securing an antenna to a substrate, associating an RFID chip to the antenna with an adhesive, and applying heat to the antenna to cure the adhesive, with the antenna being heated without externally applied heat.

Systems for manufacturing an RFID device are described herein. In some embodiments, the system includes an antenna application station configured to apply an antenna to a substrate, a heating station configured to apply heat to the antenna, and a chip application station configured to associate an RFID chip to the antenna with an adhesive. The heating station is configured to apply heat to the antenna so as to reduce the resistance of the antenna from an initial resistance to a final resistance and/or cure the adhesive without externally applied heat.

DETAILED DESCRIPTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

The antenna of an RFID device has an inductance, resistance and parasitic capacitance associated with the structure of the antenna. The antenna structure also has a resonant frequency. Properties of the antenna and, thus, the RFID device into which the antenna is incorporated can change during the construction of the RFID device. This change in property can be utilized to control heating and energy dissipation. For example, as will be explained in greater detail herein, the resistance and/or resonant frequency of the antenna can be altered by the application of heat during construction. The change in resistance and/or resonant frequency may act as a self-limiting mechanism, causing a controlled heating and dissipation of energy.

Figure 1:
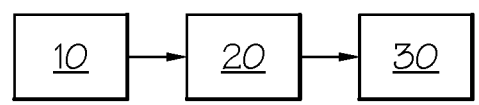
FIG. 1 is an illustrative representation of an exemplary system for manufacturing an RFID device of the current disclosure.

An exemplary embodiment of a system for manufacturing an RFID device according to the present disclosure is illustrated in FIG. 1 and includes an antenna application station 10, a heating station 20, and a chip application station 30.

The antenna application station 10 is configured to apply an antenna to a substrate. The antenna can contain a conductive ink, a conductive metal, or other antenna types known in the art. The substrate can be any of a number of applicable materials and can have varying sizes and shapes, and it should be understood that the present disclosure is not limited to any particular antenna configuration or any particularly configured antenna application station 10.

The heating station 20 is configured to apply heat to the antenna. According to an aspect of the present disclosure, that heating does not utilize external heat, as will be described in greater detail herein.

The chip application station 30 is configured to associate or electrically couple an RFID chip to the antenna according to any suitable approach. In one exemplary embodiment, the RFID chip may be attached to the antenna by adhesive. The chip application station 30 and the individual RFID chips may be variously configured without departing from the scope of the present disclosure.

FIG. 1 shows a sequence in which an RFID device is manufactured by components thereof passing through the antenna application station 10, the heating station 20, and then the chip application station 30, but it should be understood that other sequences are possible. For example, in one embodiment, an RFID chip is applied to an antenna using the chip application station 30 before proceeding to the heating station 20, which applies heat to cure an adhesive associating the RFID chip to the antenna. It should also be understood that additional stations (e.g., a testing station to test an assembled RFID device) may also be employed without departing from the scope of the present disclosure.

Figure 2:
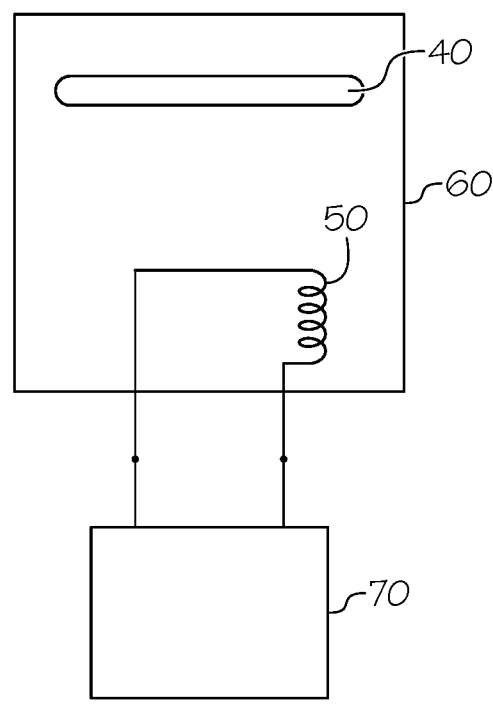
FIG. 2 is an illustrative representation of an exemplary system for applying a changing magnetic field to the antenna of an RFID device, according to an aspect of the current disclosure.

Turning back now to the heating station 20 (which may be variously configured without departing from the scope of the present disclosure), it may apply heat to the antenna of an RFID device in any of a variety of ways. Preferably, the heating station 20 is configured to heat an antenna without the application of external heat. The heating can include, for example, inducing current flow through the antenna, which can be done by exposing the antenna to a changing magnetic field. FIG. 2 illustrates an exemplary assembly that may be employed by the heating station 20 to induce current flow through an antenna 40. In the embodiment of FIG. 2, a self-resonant coil-type antenna 40 is placed in the vicinity of an alternating current magnetic field generator 70 tuned to $F_{res}$, which is also the resonant frequency of the antenna 40 in one embodiment. A current is passed through a drive coil 50 of the magnetic field generator 70 to generate a changing magnetic field 60. The changing magnetic field 60 induces current flow through the antenna 40, according to the principle of electromagnetic induction.

Figure 3:
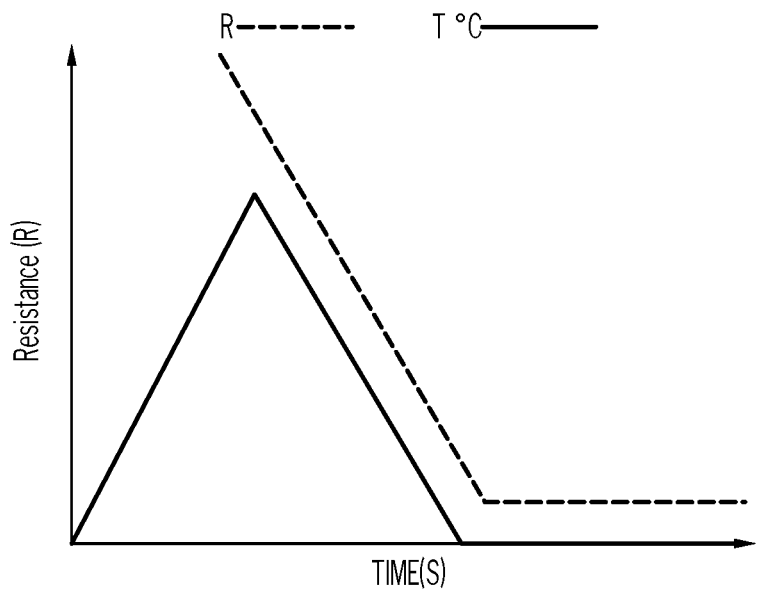
FIG. 3 is a graph showing an exemplary relationship between antenna resistance, temperature and time of an indirect heating system according to an aspect of the present disclosure.

Inducing current flow through the antenna 40 will cause the antenna 40 to heat up and the resistance of the antenna 40 to decrease. FIG. 3 is a graph showing an exemplary relationship between antenna resistance (R), temperature (T° C.) and time (s) for a heating station 20 employing a heating mechanism of the type shown in FIG. 2. Current flowing in the antenna 40 is related to the impedance of the coil dissipated by the resistance of the antenna, and therefore the temperature increases. As resistance is a function of time and temperature, resistance drops as temperature increases. As resistance drops, the energy dissipated drops, limiting the increase of temperature and, eventually, the temperature decreases and will end up at a steady state where the heat dissipation and induced heating with resistance is equal. It can, thus, be said that the heating according to this approach is self-limiting, in that when the resistance of the antenna 40 drops to its desired final state, the energy dissipation in the antenna 40 due to induced current drops. As can be seen in FIG. 3, the antenna 40 is heated to a maximum temperature, with the temperature automatically decreasing (without varying the manner in which the magnetic field 60 is applied) while the resistance of the antenna 40 continues to decrease to its final value (at which time the temperature of the antenna 40 is substantially constant).

As heat is applied to the antenna 40 in a self-limiting way, high strength magnetic fields 60 inducing high currents can be used safely, as the antenna 40 cannot overheat, meaning that curing can be completed quickly. By making the heating of the antenna 40 rapid (and carried out without externally applied heat), the energy delivered to the associated substrate is reduced and localized to an area directly under the antenna 40. If a thin non-conducting layer, for example a varnish, is applied between the antenna 40 and the substrate, no energy will be dissipated in this layer, so transfer of heat is only associated with conduction through the material rather than direct contact between the heated antenna 40 and the underlying region of the substrate.

Figure 4:
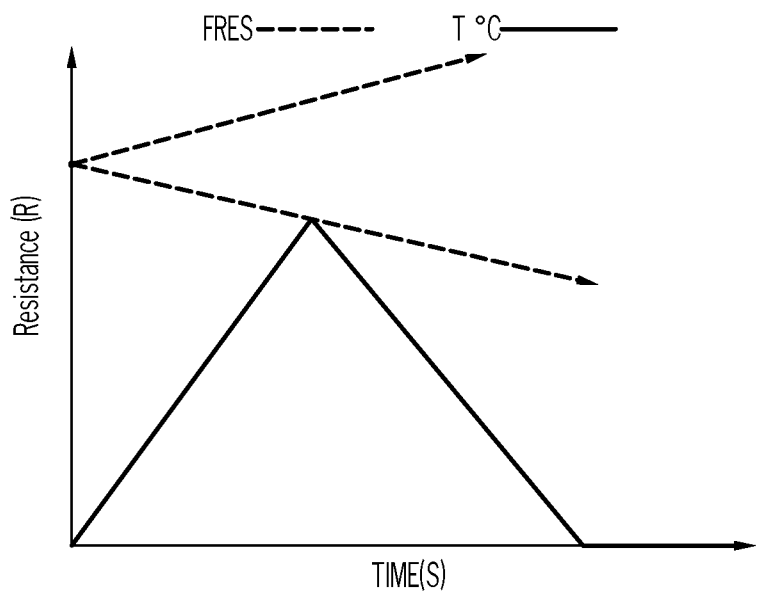
FIG. 4 is a graph showing an exemplary relationship between resonance frequency, temperature and time of an indirect heating system according to an aspect of the present disclosure.

During the application of heat at the heating station 20, the resonant frequency of the antenna 40 can remain constant or change over the course of the process. FIG. 4 is a graph showing an exemplary relationship between resonant frequency ($F_{res}$), temperature (T° C.) and time (s) for a heating station 20 employing a heating mechanism of the type shown in FIG. 2 to an antenna 40 having a resonant frequency configured to change upon application of heat. According to the relationship illustrated in FIG. 4, the curing of the antenna 40 changes the resonant frequency, either up or down, over time when energy is dissipated. The field is initially applied at the uncured self-resonance of the antenna 40. As the resonant frequency $F_{res}$ of the antenna 40 changes (while the magnetic field generator 70 continues operating at the same frequency), the adsorption of energy drops (due to the increasing difference between the resonant frequency $F_{res}$ of the antenna 40 and the frequency at which the magnetic field generator 70 operates), ensuring complete curing in a self-limiting regulated way. As can be seen in FIG. 4, the antenna 40 is heated to a maximum temperature, with the temperature automatically decreasing (without varying the manner in which the magnetic field 60 is applied) while the resonant frequency of the antenna 40 continues to change to its final value.

Figure 5:
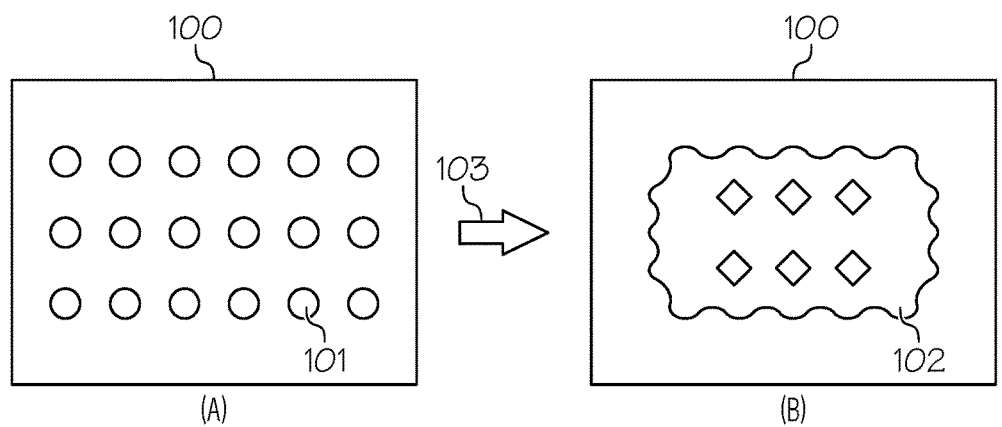
FIG. 5 is an illustration of a change in particle fusion of an antenna during heating, resulting in reduced energy dissipation according to an aspect of the present disclosure.
Figure 6:
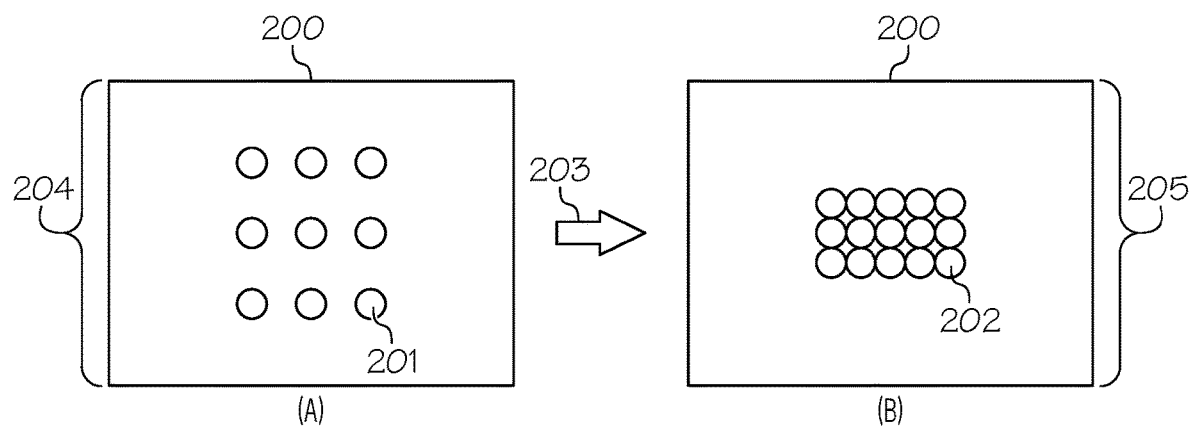
FIG. 6 is an illustration of a change in thickness of an antenna during heating, resulting in reduced energy dissipation according to an aspect of the present disclosure.

FIGS. 5 and 6 illustrate mechanisms by which the resistance of an antenna 40 may be reduced, with the change in resistance either not including a change in resonant frequency (FIG. 5) or including a change in resonant frequency (FIG. 6). FIG. 5 shows an antenna 100 in an initial state (A) and second state (B). Antenna 100 has discrete particles 101 and is cured (represented in FIG. 5 by arrow 103) to the second state (B) in which the particles are fused together, as indicated at 102. The resistance of the antenna 100 drops between the initial state (A) and the second state (B), with the decrease in resistance being related to the particles 101 being fused or brought into proximity with an increasing temperature. Exemplary materials that will exhibit such behavior include silver flakes, copper particles and graphene flakes. As resistance is reduced, the dissipated energy is reduced as shown in the graph of FIG. 3, without changing the resonant frequency of the antenna.

FIG. 6 shows an antenna 200 moving from an initial state (A) to a second state (B) due to the application of heat, which is represented in FIG. 6 by arrow 203. Antenna 200 has discrete particles 201 which are pushed together as the antenna 200 is heated, as indicated at 202. This is caused by the application of heat reducing the thickness of the antenna 200 from a first thickness 204 to a second thickness 205. In addition to reducing the resistance of the antenna 200, this change also reduces capacitance between turns of the antenna 200, increasing the resonant frequency, resulting in the self-regulating mechanism shown in the graph of FIG. 4.

The coupling of energy from the magnetic field generator 70 to the antenna 40 can be used to assess the state of the antenna 40 and determine the effectiveness of the self-regulating mechanism. As explained above, heating of the antenna 40 involves the transfer of energy from the magnetic field generator 70 to the antenna 40. For a magnetic field generator 70 driven with a defined current, the voltage across the drive coil 50 will increase as less energy is dissipated in the coupled coil antenna 40. Analyzing the voltage over time should, therefore, provide insight to the state of the antenna 40, with increasing voltage indicating a successful transfer of energy to the antenna 40. An unusual profile (e.g., in which the voltage alternately increases and decreases or remains substantially unchanged) could indicate issues with the adhesive chemistry and/or mechanical issues with the antenna 40, such as cracking.

It should be understood that monitoring the voltage is not the only way to assess the state of the antenna 40, but that other approaches may also be employed. For example, in an alternative embodiment in which the current associated with driving the drive coil 50 is adjusted to achieve a substantially fixed voltage, the nature of the energy transferred to the antenna 40 may be determined from an analysis of that current.

Figure 7:
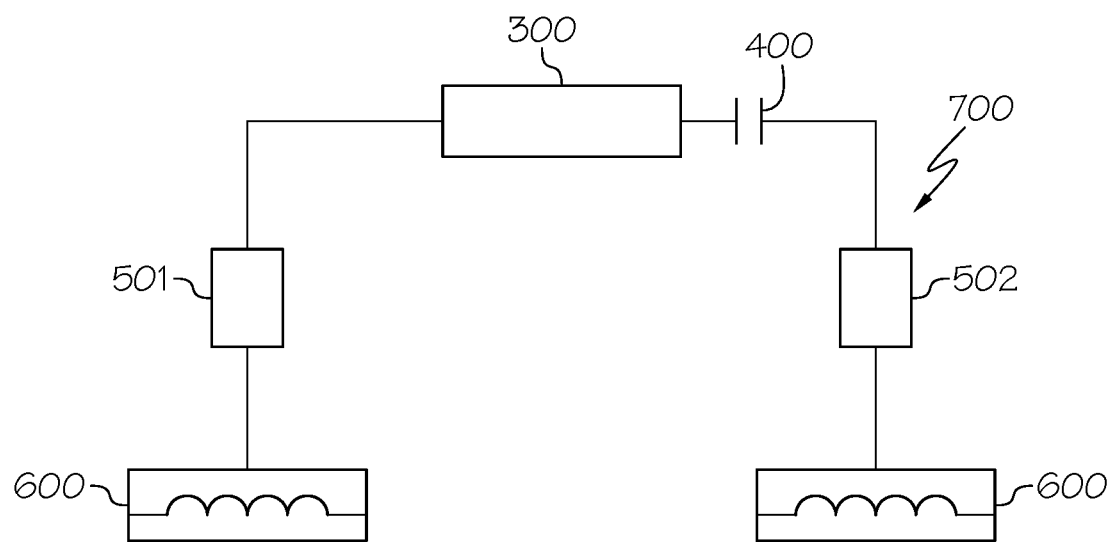
FIG. 7 is an illustration of an RFID device in which an RFID chip is connected to an antenna across a gap, with heating techniques according to the present disclosure being employed on the RFID device.

As described above, the heating principles described herein are not limited to the application of heat to an antenna before it is associated to an RFID chip, but rather it should be understood that the principles described herein may also be employed with an antenna having an associated RFID chip, as in FIG. 7. In the embodiment of FIG. 7, an RFID chip 700 is connected to an antenna 600 across a gap. The RFID chip 700 has a chip resistance 300 and a parasitic capacitance 400, with the RFID chip 700 being associated to two regions of the antenna 600 at first and second joints 501 and 502 positioned on opposite sides of the gap. The total resistance attributable to the presence of the RFID chip 700 is, thus, the sum of the chip resistance 300 and the joint resistance. The antenna 600 may be tuned to relatively low frequency (e.g., 13.56 MHz) when the joints 501 and 502 are complete or a higher frequency (e.g., 915 MHz).

In one embodiment, the initial joint resistance is greater than the chip resistance 300 so, with a current flowing, the energy dissipation and hence heating, is higher at the joints 501 and 502 than in the RFID chip 700. This causes applied heat to complete the joints 501 and 502 (e.g., curing an adhesive applied between the RFID chip 700 and the antenna 600), rather than damaging the RFID chip 700. As explained above with respect to the resistance of the antenna, heating the joints 501 and 502 will cause the resistances at the joints 501 and 502 to decrease, such that the resistances at the joints 501 and 502 may change from an initial value that is greater than the resistance 300 of the RFID chip 700 to a final value that is less than the final resistance 300 of the RFID chip 700.

It should be understood that other mechanisms may also be employed to control the amount of heat and energy transmitted to an antenna (and, optionally to a joint between the antenna and an RFID chip). For example, energy may be transmitted to an antenna (so as to induce a current through the antenna and increase its temperature, according to the principles described herein) over a defined frequency band, with the transmission of energy being controlled by the Q factor of the antenna. Alternate sources of energy can involve the use of shaped noise, a modulated carrier driven by a pseudo random number generator, a hopping signal or other suitable means.

Figure 8A:
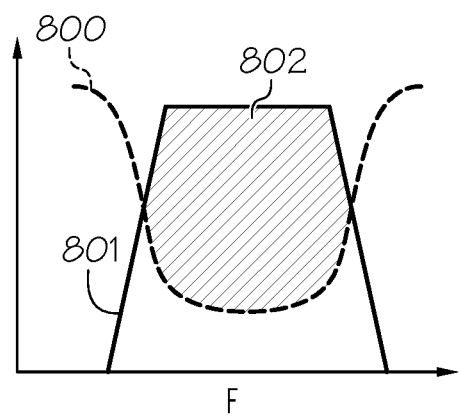
FIG. 8A is a graph of energy transfer to an RFID device over a defined frequency band with a low Q resonator.

At the beginning of a heating procedure, the antenna will have a relatively high resistance and, hence, a relatively low Q factor. FIG. 8A illustrates energy transfer to the antenna over a defined frequency band at the beginning of a heating procedure. In FIG. 8A, the field power is generally indicated at 801, with the device acceptance area (which is defined by the Q factor) generally indicated at 800 and energy transfer generally indicated at 802 (the overlap between 800 and 801). With a low Q factor, the antenna will adsorb and dissipate energy from a larger portion of the available energy, with the temperature of the antenna increasing and the resistance of the antenna decreasing over time (as described above).

Figure 8B:
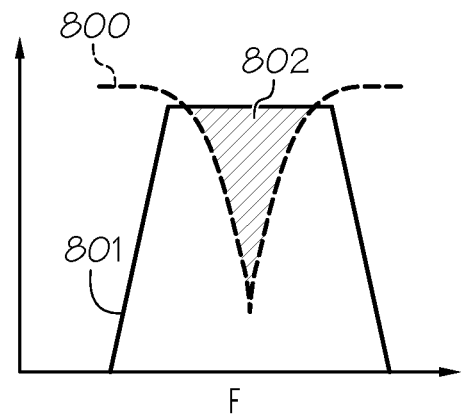
FIG. 8B is a graph of energy transfer to an RFID over a defined frequency band with a high Q resonator.

Decreasing resistance has the effect of increasing the Q factor, such that energy transfer will be according to the relationship illustrated in FIG. 8B later in a heating procedure. As can be seen by comparing FIGS. 8A and 8B, a higher Q factor will reduce the device acceptance area 800, thus decreasing the amount of energy absorbed and dissipated (as represented by the overlap 802). As can be seen, the energy absorbed and dissipated (and, hence, the temperature of the antenna) is reduced when the desired cured or sintered state is achieved, resulting in a self-limiting process.

Regardless of the particular approach to curing or sintering components of an RFID device without externally applied heat, it will be appreciated that heating techniques according to the present disclosure have many advantages. For example, one advantage is the ability to use the heating techniques described herein when the RFID device or antenna is associated to a non-planar or irregularly shaped substrate, such as an RFID device or antenna positioned on a package. Curing materials on irregular surfaces or with the area to be cured in different locations in the process area can be difficult using conventional techniques. For example, areas closer to an external heat source will tend to receive more energy than areas positioned farther from the heat source. In contrast, by using a self-limiting mechanism according to the present disclosure, the field delivered can always be made above the minimum level required to achieve the wanted curing in the required time. While an antenna positioned closer to the field will receive higher levels of energy than an antenna positioned farther from the field (when multiple antennas are simultaneously heated, for example), due to one of the self-limiting mechanisms described herein, the peak temperature and profile are adequately stable to ensure that all antennas are cured without over-heating.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A method of manufacturing an RFID device, comprising:
   attaching or adhering an antenna to a substrate;
   increasing the temperature of antenna, without externally applied heat, to reduce the resistance of the antenna from an initial resistance to a final resistance, wherein the increasing the temperature of the antenna comprises causing current flow through the antenna using a magnetic field generator placed in a vicinity of the antenna;
   coupling an RFID chip to the antenna with an adhesive, wherein the adhesive is cured due to increasing temperature of the antenna; and
   monitoring a voltage of the magnetic field generator in order to assess a state of the antenna.

2. The method of claim 1, wherein current flow through the antenna is induced by exposing the antenna to a changing magnetic field.

3. The method of claim 2, wherein the temperature of the antenna is increased to a maximum value to reduce the resistance of the antenna and then the temperature of the antenna is decreased while continuing to reduce the resistance of the antenna.

4. The method of claim 3, wherein the temperature of the antenna is increased and decreased without varying the manner in which the magnetic field is changed.

5. The method of claim 3, wherein the temperature of the antenna is substantially constant when the resistance of the antenna has decreased to the final resistance.

6. The method of claim 2, wherein the monitoring the voltage of the magnetic field generator comprises assessing the processing of the antenna.

7. The method of claim 1, wherein the resistance of the antenna is decreased without changing a resonant frequency of the antenna.

8. The method of claim 1, wherein decreasing the resistance of the antenna also changes a resonant frequency of the antenna.

9. The method of claim 1, wherein the antenna is heated before the RFID chip is coupled to the antenna.

10. The method of claim 1, wherein
    the RFID chip is associated to the antenna before the antenna is heated, and
    applying heat to the antenna to couple the RFID chip to the antenna.

11. The method of claim 1, wherein
    Increasing the temperature of the antenna includes transmitting energy to the antenna over a defined frequency band, and
    the transmission of energy to the antenna is based at least in part on a Q factor of the antenna.

12. The method of claim 11, wherein energy is transmitted to the antenna using shaped noise.

13. The method of claim 11, wherein energy is transmitted to the antenna using a modulated carrier driven by a pseudo-random number generator.

14. The method of claim 11, wherein energy is transmitted to the antenna using a hopping signal.

15. The method of claim 1, wherein increasing the temperature of the antenna comprises applying heat only to portions of the substrate in contact with or directly adjacent to the antenna and not to portions of the substrate spaced from the antenna.

16. The method of claim 1, wherein the substrate is non-planar.

17. The method of claim 1, wherein the configuration of the antenna limits the maximum temperature of the antenna.

18. A method of manufacturing an RFID device, comprising:
    attaching an antenna to a substrate;
    associating an RFID chip to the antenna with an adhesive;
    increasing the temperature of the antenna, without externally applied heat, to cure the adhesive and couple the RFID chip to the antenna, wherein the increasing the temperature of the antenna comprises causing current flow through the antenna using a magnetic field generator placed in a vicinity of the antenna; and
    monitoring a voltage of the magnetic field generator in order to assess a state of the antenna.

19. A system for manufacturing an RFID device, comprising:
    an antenna application station configured to attach an antenna to a substrate;
    a chip application configured to associate an RFID chip to the antenna with an adhesive; and
    a heating station configured to cure the adhesive by increasing the temperature of the antenna, without externally applied heat, wherein the temperature of the antenna is increased by causing current to flow through the antenna using a magnetic field generator placed in a vicinity of the antenna, so as to reduce the resistance of the antenna from an initial resistance to a final resistance, and wherein a state of the antenna is assessed by monitoring a voltage of the magnetic field generator.

* * * * *